(No Model.)

R. P. SCOTT & J. A. CHISHOLM.
PROCESS OF CLEANING GREEN PEAS.

No. 542,810. Patented July 16, 1895.

WITNESSES:
Frank Bayless
E. S. Woodbine
John A. Chisholm

INVENTORS
Robert P. Scott.
BY John A. Chisholm
Robert P. Scott
ATTORNEY.

UNITED STATES PATENT OFFICE.

ROBERT P. SCOTT, OF CADIZ, OHIO, AND JOHN A. CHISHOLM, OF OAKVILLE, CANADA.

PROCESS OF CLEANING GREEN PEAS.

SPECIFICATION forming part of Letters Patent No. 542,810, dated July 16, 1895.

Application filed July 19, 1894. Serial No. 518,061. (No model.)

*To all whom it may concern:*

Be it known that we, ROBERT P. SCOTT, residing at Cadiz, Harrison county, Ohio, and JOHN A. CHISHOLM, residing at Oakville, Ontario, Canada, have invented a new and Improved Process of Cleaning Green Peas after the Blanch, of which the following is a specification, reference being had to the annexed drawings, in which—

Figure 1:
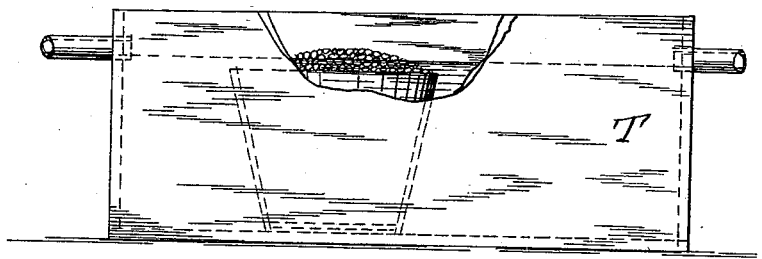
Figure 2:
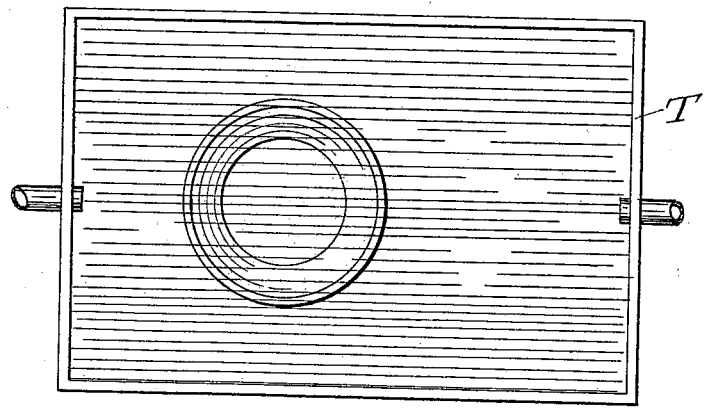
Figure 3:
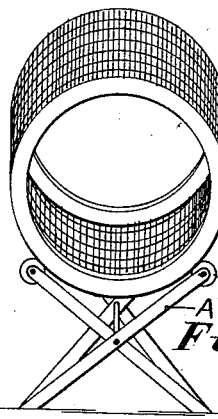
Figure 4:
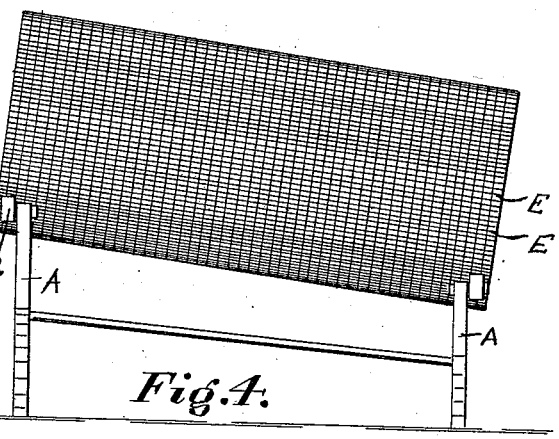

Figures 1 and 2 are views of a blanching-tub, and Figs. 3 and 4 are views of the cleaning-cylinder which we employ.

Ever since the invention by the Chisholm brothers, covered by United States Patent No. 421,244, of the mechanical, impact process of hulling green peas, the common practice of preparing peas for the cans has been about as follows: The green peas have been hulled in a perforated cylinder, falling from these onto an inclined endless apron which acts to partially clean the peas, the impurities passing to the upper and the green peas rolling to the lower end of the apron. The peas were then sorted in a sorting-cylinder and at the same time were subjected to an air-blast for removing any further impurities, such as dirt, pea-shells, pea-skins, and the like. After this the peas were blanched—that is to say, they were subjected for about a minute to the direct action of boiling water, which, it is supposed, removes any starch which may exist near the surface. This blanching is important and has been and is universally used by all canners for giving the peas a color which renders them more salable and for making a clear liquor in the can. The blanching also adds to the cleanliness and removes a rank taste of the pea. The operation of blanching, however, softens the pea-skins, so that any skins which might be split or bruised drop off. To remove these split peas and pea-skins the peas have heretofore been passed over flat cleaning-tables with girls standing at each side, who picked out the skins and split peas by hand. After this the peas were filled into cans, processed, and sealed.

Green peas have always been considered about the most delicate vegetable which packers handle, and after the green peas have been blanched, as above described, and have thereby in effect been partially cooked and rendered soft, it has always been considered impossible by those skilled in the art to subject such blanched peas to any mechanical cleaning process.

Our invention rests partially upon the discovery that it is possible to subject blanched peas to a mechanical cleaning process without injuring the peas.

Our invention is furthermore based upon the peculiar action which a cleaning device of the character shown in the drawings has upon green peas after they have been blanched.

In Fig. 1 we have merely shown a common blanching-tub T filled with boiling water, in which a bucket of green peas are shown undergoing the blanch.

The cleaning device shown in Figs. 3 and 4 consists of an inclined cylinder mounted upon a trestle A and revolved by a pulley B, connected to the traveler C. This cylinder is covered with a wire-cloth fabric with a rectangular mesh, the long side of the rectangle being parallel to the axis of the cylinder. The cross-wires D may be as far apart as is consistent with rigidity, the work being done by the straight wires E, which are placed as far apart as it is possible to place them without allowing any peas to drop through. These wires E constitute the working edges and are in the direction of the length of the cylinder.

According to our invention after the peas have been blanched we run them, together with such impurities as may not have previously been removed and with the split peas and pea-skins which may have been developed by the blanch, into the rotary cleaning device above described, the whole forming a mass of some thickness upon the bottom of the cylinder. The rotation of the cylinder conveys a gentle rolling motion to all the peas, and the inclination of the cylinder passes the peas toward the discharge end. A pea, for instance, which lies between two adjacent wires E, will in the rotation of the cylinder be rolled around by the friction against these wires and against the superincumbent mass of peas. Any pea-shell, pea-skin, or split pea which gets in the neighborhood of the grating will thus be rolled around a wire E by the peas and pass through to the outside of the cylinder. Again, since the split pea-skins are now soft and flabby, having been made so by the blanch, they will be more readily rolled out between the wires than would have been the case with the rather springy split pea-skins before the blanch. Again, the gentle uniform circular motion of the cylinder, rotating all the peas in one direction, is not merely of advantage in avoiding the shocks and jars incident to a shaking or reciprocating cleaner, but, morever, by continually rolling the peas in the same direction it acts to roll out the split pea-skins from between the wires more efficiently. In a shaking cleaner any pea-skin which was caught between the wires and was about to fall out of the cylinder would be rolled back and forth across the wire and would not be rolled out as with the circular cleaner shown.

It may be said in conclusion that the problem of removing the impurities from green peas which are found therein after the blanch has excited considerable attention within the last six years, that we have constructed several machines of rather a complicated character to do the work, and that the process above described is not only the simplest but the most satisfactory for the purpose stated, saving as it does the labor of a number of girls heretofore considered indispensable, who have picked out the impurities by hand, doing better work and adding to the selling price of the canned peas, and all with the use of apparatus which seems to be about the acme of simplicity.

What we claim is—

1. The process of cleaning green peas which consists in first blanching them by subjecting them for a short time to the action of boiling water and thereafter to the action of a rotary screening cylinder having its working edges arranged longitudinally of the cylinder substantially as described.

2. The process of cleaning green peas which consists in first blanching them by subjecting them for a short time to the action of boiling water and thereafter to the action of a movable screening surface having its working edges arranged at an angle to the line of motion of the screening surface substantially as described.

ROBERT P. SCOTT.
JOHN A. CHISHOLM.

Witnesses as to signature of Robert P. Scott:
THOS. M. DOBBIN,
WILLIAM H. BERRY.

Witnesses as to signature of John A. Chisholm:
ROBERT N. LAMB,
R. HILL.